United States Patent [19]

Matsushima

[11] Patent Number: 5,241,438
[45] Date of Patent: Aug. 31, 1993

[54] MAGNETIC DISK DRIVE DEVICE WITH MECHANICAL PARKING MECHANISM

[75] Inventor: Noriaki Matsushima, Tokyo, Japan

[73] Assignee: Kyocera Corporation, Kyoto, Japan

[21] Appl. No.: 581,325

[22] Filed: Sep. 11, 1990

[30] Foreign Application Priority Data

Sep. 12, 1989 [JP] Japan .................. 1-234765
Sep. 28, 1989 [JP] Japan .............. 1-114692[U]
Feb. 26, 1990 [JP] Japan .................... 2-46972

[51] Int. Cl.⁵ ............................................. G11B 5/54
[52] U.S. Cl. ................................................. 360/105
[58] Field of Search ..................................... 360/105

[56] References Cited

U.S. PATENT DOCUMENTS 4,484,241 11/1984 Brende .................. 360/105
4,703,376 10/1987 Edwards ............... 360/105
4,752,848 6/1988 Garcia .................... 360/105

Primary Examiner—A. J. Heinz
Attorney, Agent, or Firm—Spensley Horn Jubas & Lubitz

[57] ABSTRACT

A magnetic disk drive device comprises a rotary magnetic disk, and a magnetic read/write head, supported by a flexure capable of swinging with respect to the magnetic disk, which floats on the magnetic disk as a result of the rotation of the magnetic disk and is driven to access the disk. In this magnetic disk drive device, the magnetic disk is driven in rotation, and a lifter is provided to support the flexure so that the magnetic read/write head and the magnetic disk are maintained in a non-contacting state at the inner peripheral side of a data region on the magnetic disk. In addition, a parking drive method for a magnetic read/write head for the above magnetic disk drive device is described.

12 Claims, 15 Drawing Sheets

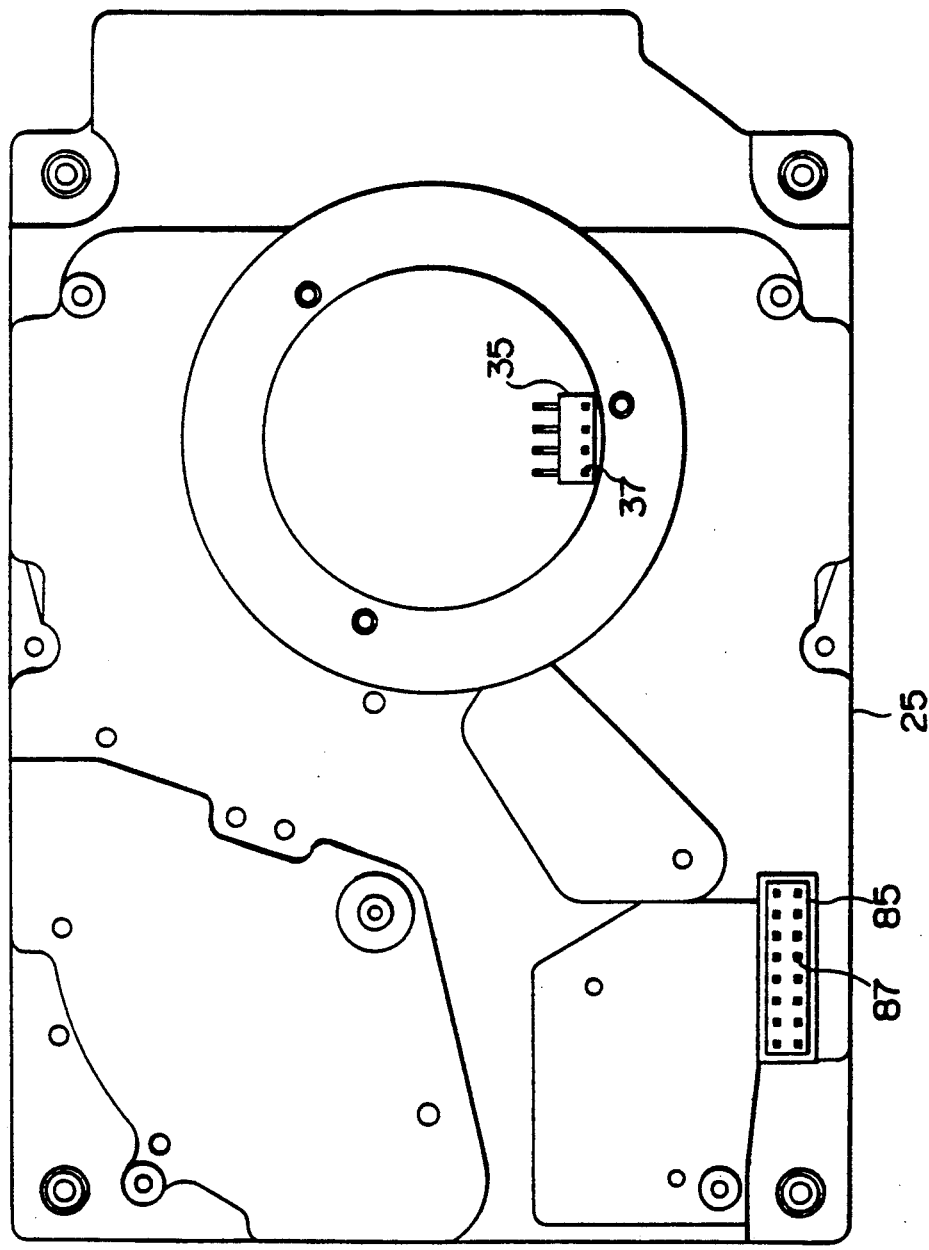

MAGNETIC DISK DRIVE DEVICE WITH MECHANICAL PARKING MECHANISM

BACKGROUND OF THE INVENTION

1. Field of the Invention

The present invention relates to the structure and layout of a small, thin magnetic disk drive device used as an external memory device for a computer.

The present invention also relates to a parking drive mechanism for a magnetic head which, when a magnetic disk drive device is halted, utilizes the counter electromotive voltage from a disk rotary drive member (spindle motor) to drive a magnetic head drive member and move the magnetic head to a parking position.

2. Description of the Prior Art

A non-contact type magnetic head, generally, a floating magnetic head, is normally used in a magnetic disk drive device to avoid damage to the magnetic disk, which is the recording medium. This magnetic head, for example, is mounted on a flexure on which an actuator can swing, and from the balance between the pressure of the flexure which energizes the magnetic head to the surface of the magnetic disk and the floating force from the airflow produced by the rotation of the magnetic disk, a minute amount of floating is obtained. This type of magnetic disk drive device is generally driven by a contact start/stop system (CSS), in which system, the magnetic disk and the magnetic head remain in contact with each other either when the magnetic disk drive device is started or when the device is halted. With this system, the magnetic head on standby is normally in contact with the magnetic disk. When the device is started, the magnetic disk rotates and the airflow accompanying this rotation causes the magnetic head to float up from the surface of the magnetic disk, and drives it to access the disk for recording or read-out of data, and when the device is halted the magnetic head comes to rest at that point, and is maintained in contact with the magnetic disk. However, with this type of system, there is the problem of damage to the magnetic head or magnetic disk at the memory section of the magnetic disk, caused by the magnetic head coming to rest after floating. In addition, when contact is maintained over a long interval, there is the problem that the magnetic head adheres to the magnetic disk so that it cannot start. Further, the actuator when not in use can swing during transportation or from some external force, causing problems from the clashing of the magnetic head and magnetic disk.

Accordingly, in Japanese Laid-Open Patent Application 60-38773 a configuration was proposed in which the magnetic head does not contact the magnetic disk during a stoppage in operation, preventing adherence of the magnetic head to the magnetic disk when the device is not in use.

However, even with this system damage to both the magnetic head and the magnetic disk from impact cannot be avoided.

In Japanese Patent Publication 63-15671, it has been proposed that the actuator be driven by utilizing the counter electromotive force from a spindle motor when a power outage occurs. The magnetic head comes to rest at a non-memory section of the magnetic disk and is locked at that position so that the actuator is secured in an immovable state. On starting up, by freeing the actuator the magnetic head can be moved to a resting position with good efficiency by shutting off the power, and locked at that position so that damage to the magnetic head and the magnetic disk from the swings of the actuator during transportation or from some external force is prevented.

However, in a conventional parking transfer system using a spindle motor, because the counter electromotive voltage from the rotation of the spindle motor when the system is halted is directly applied to a voice coil motor (magnetic head drive device), excess current flows to the voice coil motor, and the actuator which supports the magnetic head moves at high speed so that the stopper is subjected to excessive impact. This causes the problem that the magnetic head damages the magnetic disk, or bounces back so that it cannot either come to rest or be locked in a normal position.

As a countermeasure, an attempt was made to increase the cushioning using a stopper made from a more flexible, high grade rubber material, but the cost was increased and the necessity for precise positioning was produced which led to unstable quality. Furthermore, no countermeasure was taken to prevent the adhesion of the magnetic head to the magnetic disk.

In addition, the system by which the magnetic head is raised and parked at the outer side of the magnetic disk during the halt in operation is also known. However, with this system, for some reason, when the parking mechanism is not operated skillfully, the magnetic head falls off the magnetic disk, causing a major problem. Also, because it frequently happens that important data has been written into the outer peripheral section of the magnetic disk, if an error occurs during the parking operation important data is destroyed and there is concern that this could lead to a non-recoverable condition. Furthermore, in order to move the head to the outside of the magnetic disk, the range of movement of the magnetic head must be large, requiring a large voice coil motor, leading to the problem that it is difficult to make an over-all compact device.

A device for parking the magnetic head on the outer peripheral section of the magnetic disk in this manner is marketed by the PrairieTek Corporation (US) as its Model 220A.

In addition, other than the above, automatic parking mechanisms have been disclosed in U.S. Pat. No. 4,562,500, U.S. Pat. No. 4,654,735, U.S. Pat. No. 4,755,982, Japanese Patent Publication 63-55154, Japanese Utility Model Publication 56-35984, Japanese Laid-Open Patent Application 58-45670, Japanese Laid-Open Patent Application 60-133577, Japanese Laid-Open Patent Application 60-147980, Japanese Laid-Open Patent Application 61-77174, Japanese Laid-Open Patent Application 61-269275, and Japanese Laid-Open Patent Application 61-287084; lock mechanisms have been disclosed in Japanese Patent Publication 63-48110, Japanese Laid-Open Patent Application 60-29981, Japanese Laid-Open Patent Application 60-106080, Japanese Laid-Open Patent Application 60-133576, Japanese Laid-Open Patent Application 60-147981, Japanese Laid-Open Patent Application 60-193180, and Japanese Laid-Open Patent Application 60-197984; lifters have been disclosed in U.S. Pat. No. 4,742,410 and Japanese Laid-Open Utility Model Application 61-158668, and the utilization of the counter electromotive force of a spindle motor in Japanese Laid-Open Patent Application 62-219274. However, none of these references discloses the device of the present invention.

In addition, a magnetic disk drive device is known, for example, in which a magnetic disk is caused to rotate, an actuator is driven by a voice coil motor, a magnetic head is caused to move in the radial direction to access the magnetic disk, and a read or a write signal is transmitted to the magnetic head so that data is read out or recorded.

Accordingly, it is necessary to have an interchange of read/write signals between an external drive circuit and the magnetic head, and to feed to a voice coil the drive current from a voice coil motor. For this reason, a flexible printed circuit substrate (FPC) is conventionally used, and the external circuit and the inside of the housing are electrically connected.

FIG. 27 is an explanatory figure showing the pull-out structure of a conventional FPC 81. The FPC 81, which is drawn out so that a side wall section 25a of a housing base 25 is ridden up, is electrically connected to a connector 151 which is provided on a drive printed circuit board (hereinafter referred to as a PCB) 13. A housing cover (omitted from the figure) is set over the housing base 25 to keep the entire device airtight via a gasket.

However, in the above structure the operation of connecting the FPC 81 and the connector 151 is poor, and is only possible manually and cannot be handled automatically. Also, the positioning of the FPC 81 is difficult and it is necessary to temporarily secure the FPC 81 with an adhesive tape to position it. Also, there is the problem that the FPC 81, when in a free state prior to being connected to the connector 151, is highly unstable and gets tangled up and broken, or the like, and is easily damaged.

In Japanese Laid-Open Utility Model Application 64-24592, a disclosure is made of a groove, formed at a position where the FPC 81 passes, which is located at the outer peripheral side surface of the sidewall section 25a of the housing base 25, and has a depth and width greater than the thickness and width of the FPC 81.

However, with this structure also, the above-mentioned problems basically cannot be eliminated.

Further, as shown in FIG. 28, a plurality of through holes is provided in a bottom plate 25b of the housing base 25, the pins of a pin header 153 are inserted into these through holes, and an adhesive 155 is filled into a space between the pin header 153 and the bottom plate 25b of the housing base 25. A socket 161 is mounted on the FPC 81 which is connected to the inside of the housing through a plurality of pins 157 inserted into the socket 161. A socket 163 is also mounted on the PCB 13 and the pins of the pin header 153 are inserted.

However, with this construction, because airtightness is required in securing the pin header 153, an operation for filling the adhesive 155 is required, and an air tightness test is also necessary, In addition, position precision is necessary to secure the pin header 153, and this positioning is difficult. This causes problems with operability and automation. In addition, two sockets (161 and 163) are necessary, and because the pin header 153 has a special shape, common parts cannot be used so the cost is increased.

SUMMARY OF THE INVENTION

It is therefore an object of the present invention is to provide, with due consideration to the drawbacks of such conventional devices, a magnetic disk drive device which can prevent damage to a magnetic head and a magnetic disk, and can reliably protect the data written on the magnetic disk.

Another object of the present invention is to provide a magnetic disk drive device of thin construction, with improved assembly capabilities.

These objects are achieved in the present invention by a magnetic disk drive device comprising a magnetic disk; and a magnetic read/write head, supported by a flexure capable of swinging with respect to the magnetic disk, which floats on the magnetic disk as a result of the rotation of the magnetic disk and is driven to access the disk, characterized in that a lifter is provided to support the flexure so that the magnetic read/write head and the magnetic disk are maintained in a non-contacting state at the inner peripheral side of a data region on the magnetic disk.

In addition, in the present invention, the lifter is supported by means of a lifter support member which extends towards the center of rotation of the magnetic disk from close to the center of rotation of a magnetic head actuator.

According to the present invention, when the magnetic disk drive device is halted, the flexure is supported by the lifter on a non-data region of the inner peripheral side of the magnetic disk, and by maintaining the magnetic head in a state in which it floats above the magnetic disk, it is possible to improve the shock-withstanding and antivibration capabilities so that the magnetic head and the magnetic disk do not clash when the magnetic disk drive device is halted. Even if the clashing takes place, it is outside the data area, no data is destroyed.

In addition, because the CSS system has not been adopted, there is no problem with adherence of the magnetic head to the disk and it becomes possible to start a small spindle motor with a high starting torque. Also, the magnetic head and the magnetic disk have improved durability.

Because the magnetic head is supported at the inner peripheral side of the magnetic disk, there is no concern that the magnetic head will be mistakenly removed to the outside of the magnetic disk because of a mishap during the parking operation.

Also, because the lifter is supported by the lifter support member which extends towards the center of rotation of the magnetic disk from close to the center of rotation of the actuator, the lifter support member can be short so that the strength and dimensional precision of the lifter is improved. The degrees of freedom of the design and layout of the magnetic disk drive device are therefore expanded and a smaller, thinner device is easily provided.

Still another object of the present invention is to provide a method of parking the magnetic head wherein, when the operation of the magnetic disk drive device is halted, there is no excess shock imparted to the magnetic head or the magnetic disk and stable parking is possible.

This object is achieved in the present invention by the provision of a first magnetic head parking drive method, wherein, when a halt is applied to the magnetic disk drive device, a counter electromotive voltage from a rotating drive member for the magnetic disk (hereinafter referred to as the magnetic disk drive member) is supplied to the magnetic head drive member to drive the magnetic head and move the magnetic head to a parking position, with a key feature that the counter electromotive voltage from the magnetic disk drive member is reduced and supplied to the magnetic head drive member to move the magnetic head to the parking position at a low speed.

This object is further achieved in the present invention by the provision of a second magnetic head parking drive method, wherein when a halt is applied to the magnetic disk drive device, the counter electromotive voltage from the magnetic disk drive member is supplied to the magnetic head drive member to drive the magnetic head and move the magnetic head to a parking position, and at the park position, the magnetic head or the flexure is engaged to ride onto the lifter, and the magnetic head is supported on the lifter with the magnetic disk in the non-engaged state, with a key feature comprising (i) a first step wherein the counter electromotive voltage from the magnetic disk drive member is supplied to the magnetic head drive member, the magnetic head is moved in the direction or the parking position, and although the magnetic head or the flexure contacts the lifter, none of them rides onto the lifter; and (ii) a second step wherein a voltage larger than the voltage applied in the first step is supplied to the magnetic head drive member which is engaged in such a manner the magnetic head or the flexure rides onto the lifter.

According to the present invention, by reducing the counter electromotive voltage from the magnetic disk drive member to a low voltage and feeding this voltage to the magnetic head drive member, when the power supply for the device is interrupted it is possible to move the magnetic head to the parking position at a suitable speed, so that an impact between the magnetic head and the magnetic disk is prevented, and it is possible to make the magnetic head come to rest on the magnetic disk at the parking position. In addition, a special, high-priced stopper or damper is not required.

Furthermore, in the present invention, because two modes are used so that the magnetic head is first moved at low speed to a position at which it contacts the lifter, and then is driven at high speed, and is engaged and supported so that it rides onto the lifter, it is possible to uniformly maintain the state of support by the lifter, and when the power is OFF, variation in the magnetic head position disappears. In addition, excess shock to the magnetic head is avoided when it is supported, and the clashing between the magnetic head and the magnetic disk is prevented.

Also, in the present invention, damage to the FPC can be prevented, and furthermore, the present invention provides a drawn-out structure of FPC in a magnetic disk drive device so that automatic operation at good operability is easily attained.

The magnetic disk drive device according to the present invention is a magnetic disk drive device utilizing a flexible printed circuit substrate for electrically connecting the inside of a housing thereof and an external drive circuit substrate disposed outside the housing, which comprises a housing base having a hollowed out section which is hollowed out in one part of a side wall thereof toward the inside of the housing; a flexible printed circuit substrate with a front tip drawn out to the outside of the housing base at the hollowed out section; a housing cover which is set on the housing base through the flexible printed circuit substrate to close the inside of the device so that it is airtight; and a connecting tool with pins disposed in close vicinity with the front end portion of the flexible printed circuit substrate, or a connecting tool into which the pins are inserted and coupled electrically, which connecting tool is accommodated in the hollowed out section, and mounted on the flexible printed circuit substrate, and a connecting tool which is mounted on the external drive circuit substrate, which connecting tools are electrically coupled by the insertion of the pins.

The following operating effects are obtained from this configuration.

(1) The connecting operation is easily performed with good operability.
(2) The connecting tools can be positioned automatically, in advance.
(3) Because the amount of the FPC which extends outside is small, damage to the FPC is avoided.
(4) An adhesive tape or the like is unnecessary for temporarily securing the FPC, and the number of essential parts is reduced.
(5) It is possible to use ordinary parts for both the pin header and socket so that cost is reduced.
(6) It is not necessary to mount a connector on the FPC in the main body of the device so that space is used advantageously and a small unit can be adopted.

BRIEF DESCRIPTION OF THE DRAWINGS

These and other objects, features, and advantages of the present invention will become more apparent from the following description of the preferred embodiments taken in conjunction with the accompanying drawings, in which:

FIG. 4 is a bottom view of the device of FIG. 1 with the PCB and bracket removed, specifically, a view showing the bottom of the housing base.

DETAILED DESCRIPTION OF THE PREFERRED EMBODIMENTS

Figure 1:
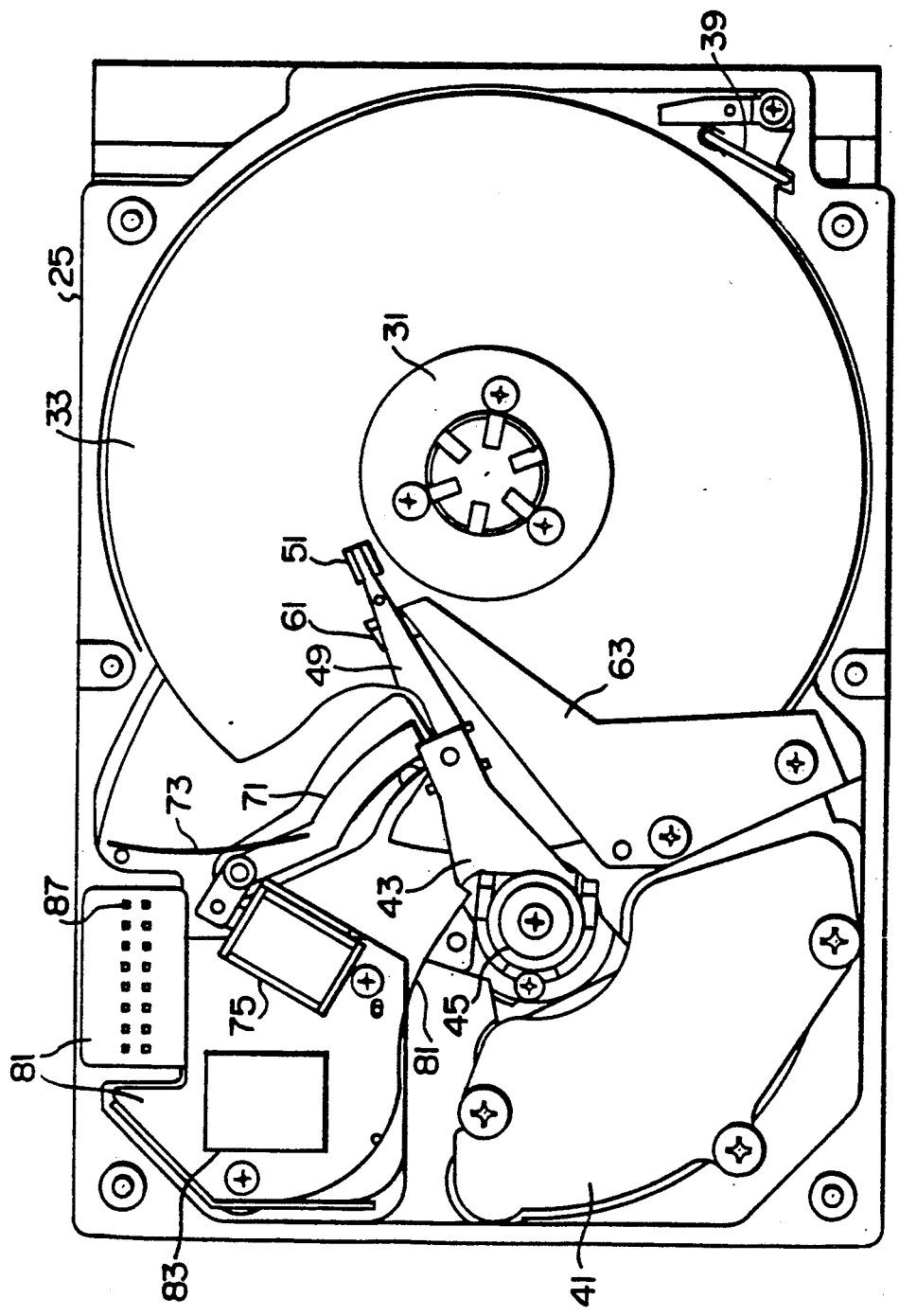
FIG. 1 is a plan view showing an example of the magnetic disk drive device of the present invention with the housing cover removed.

Now referring to FIG. 1, a magnetic disk 33 and other various members are incorporated into a housing which comprises a housing base 25 and a housing cover 21. A PCB 13 is mounted on the outer side of the housing base 25 as an external drive circuit substrate. A mounting bracket 11 is also secured to the housing base 25.

A pair of magnetic disks 33, 33 are installed on a spindle motor 31 which is secured to the housing base 25. An actuator 43 equipped with four flexures 49 is provided at the outer peripheral side of the magnetic disks 33. The actuator 43, which is equipped with a voice coil 47, is rotated around a rotary shaft 45 by means of a magnet assembly 41. Data recorded on the magnetic disks 33 is written in and read out by a magnetic read/write head 51 installed on the respective flexures 49.

A lifter support member 63 is secured to the housing base 25 in the vicinity of the rotary shaft 45 of the actuator 43. The lifter support member 63 extends from the vicinity of the rotary shaft 45 of the actuator 43 toward the center of rotation of the magnetic disks 33. The lifter 61 is secured to the end of the lifter support member 63.

In FIG. 1 the magnetic head 51 is shown in a parked position, with the flexure 49 riding up on the lifter 61, and the magnetic head 51 maintained in a non-contact state, floating above the magnetic disk 33.

A lock mechanism is provided close to the actuator 43 on the side opposite the lifter support means 63. This lock mechanism comprises a lock lever 71 which locks the movement of the actuator 43 when the magnetic head 51 is in the parked position, a wire spring 73 which energizes the lock lever 71 toward the actuator 43, and a solenoid 75 which drives the lock lever 71. The solenoid 75 is connected to an FPC 81. The FPC 81 is also connected to a read/write wire from the magnetic head 51 and the voice coil 47, and is connected to the outside by an FPC pin header 85 for controlling the driving of the FPC 81. An IC 83 is provided for signal amplification.

Figure 2:
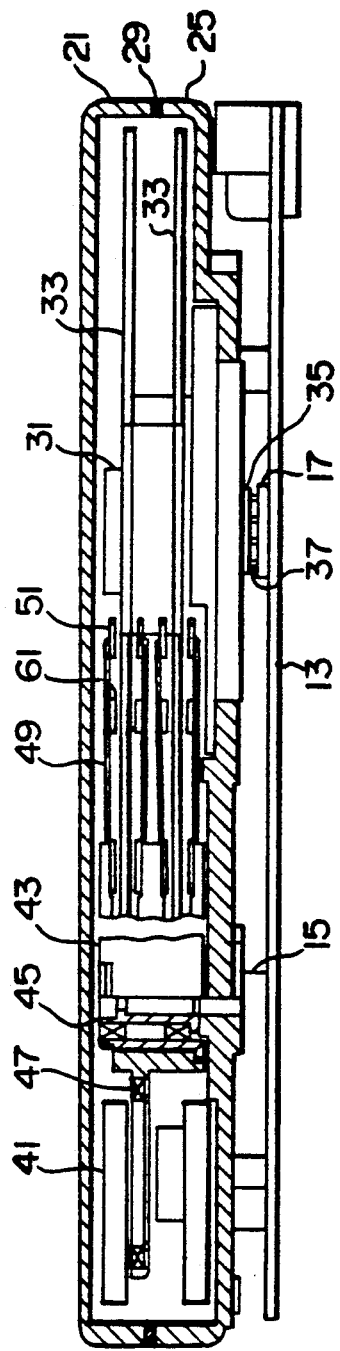
FIG. 2 is a vertical cross-sectional view of the device of FIG. 1 with the housing cover installed.
Figure 3:
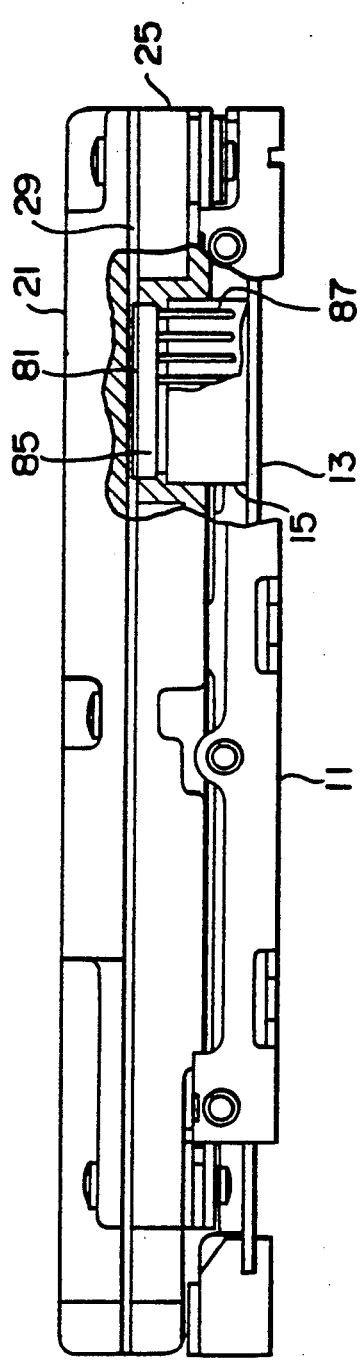
FIG. 3 is a side view of the device of FIG. 1 with the housing cover installed.

A plurality of pins 87 on the FPC pin header 85 projects from the housing base 25 and is connected to an FPC socket 15 provided on the PCB 13 (see FIG. 3). In addition, a plurality of pins 37 on a pin header 35 for the spindle motor projects from the housing base 25 and is connected to a spindle motor socket 17 provided on the PCB 13 (see FIG. 2). A filter 39 is provided for cleaning the air flowing into the housing.

Figure 5A:
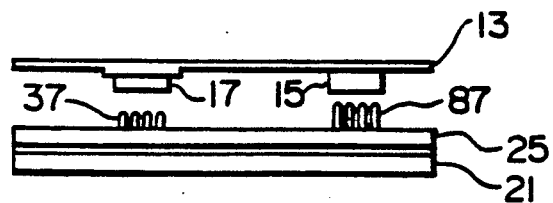
FIG. 5A and FIG. 5B are explanatory diagrams showing the housing the magnetic disk drive device connected to the PCB.
Figure 5B:
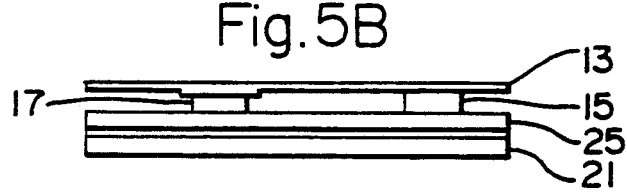

As shown in FIGS. 5A and 5B, the pins 37 on the pin header 35 for the spindle motor and the pins 87 on the FPC pin header 85 project from the housing base 25 of the magnetic disk drive device. The sockets 15 and 17 are provided in a position corresponding to the pins 37, 87 of the PCB 13. Accordingly, as shown in FIG. 5, by applying pressure to position the pin headers 87, 37 and the sockets 15, 17, the housing base 25 and the PCB 13 can be easily integrated and electrically connected. Because the FPC pin header 85 is coupled with a flexible FPC, a certain amount of movement is possible so that even when the pins 87, 37 and the sockets 15, 17 are mispositioned they are easily fitted into place to form an integral body.

Figure 6:
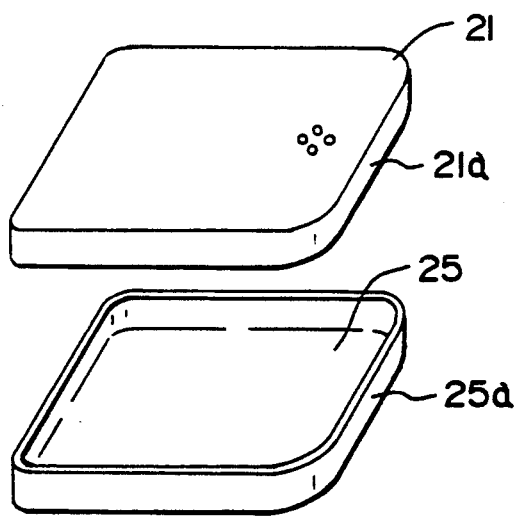
FIG. 6 is a perspective view showing the relationship between the housing base and the housing cover.
Figure 7:
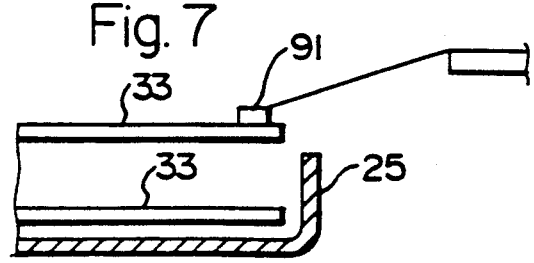
FIG. 7 is a cross-sectional view of a magnetic disk in which clock signals for writing a servo data are written prior to securing the housing cover.

As shown in FIG. 6, a pair of vertical wall sections 25a and 21a of about the same height are provided on the housing base 25 and the housing cover 21 respectively to form box-shaped housing which is made airtight by means of a gasket (omitted from the figure) when the housing base 25 and the housing cover 21 are fitted together. The vertical wall sections 25a, 21a of the housing base 25 and the housing cover 21 function as a frame which provides superior strength to the base 25 and cover 21 when these components are combined. In addition, the vertical wall section 25a of the housing base 25 can be half the height of a plate if the plate is the cover 21 without the vertical wall section 21a. Accordingly, the operation of incorporating the actuator 43 and the the lifter support means 63 into the housing base 25 and the automation of this operation are very easily accomplished. In addition, as shown in FIG. 7, after the insertion of the magnetic disk 33, a clock head 91 for a servo-writer is easily accessed when servo data is written onto the magnetic disk 33.

Figure 8:
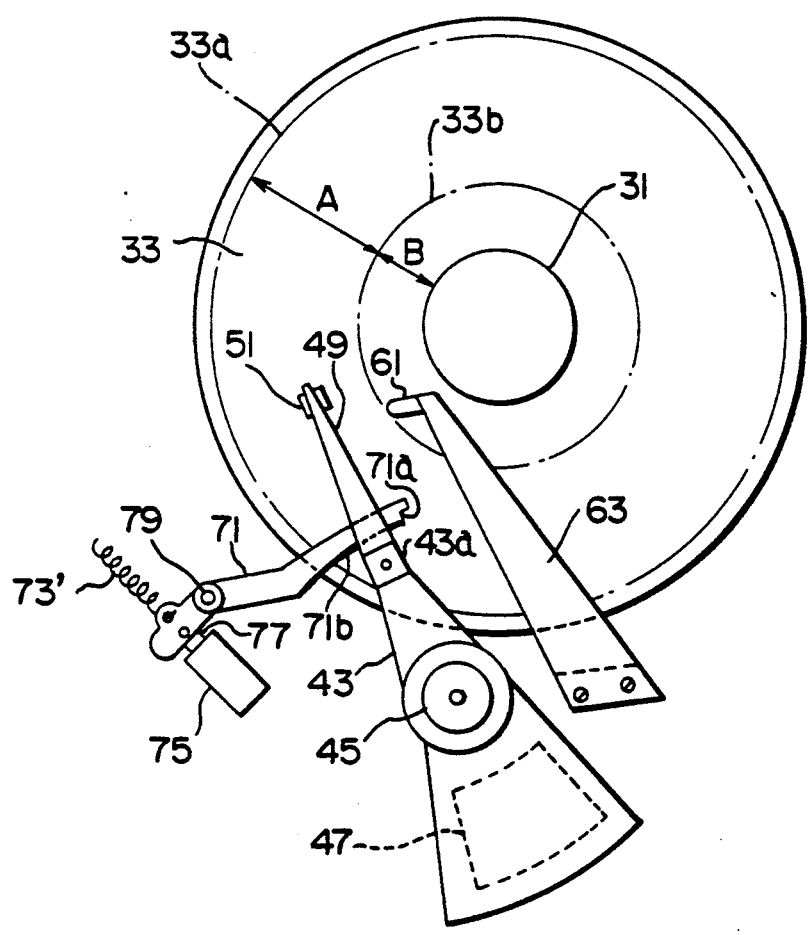
FIG. 8 is a plan view of the main portion of the magnetic disk drive device of the present invention when driven.
Figure 9:
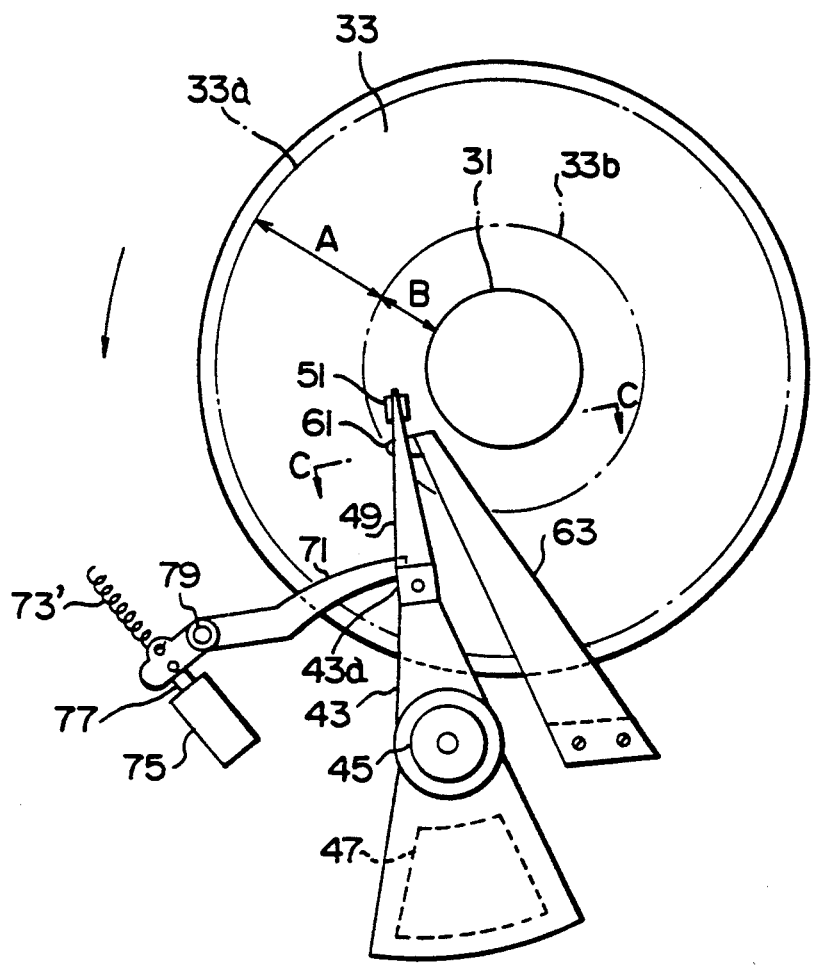
FIG. 9 is a plan view of the main portion of the magnetic disk drive device of the present invention when halted.
Figure 10:
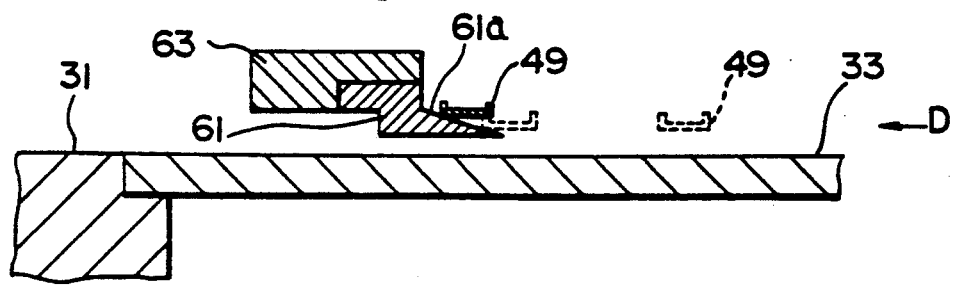
FIG. 10 is a partial cross-sectional view taken on line C—C in FIG. 9.
Figure 11:
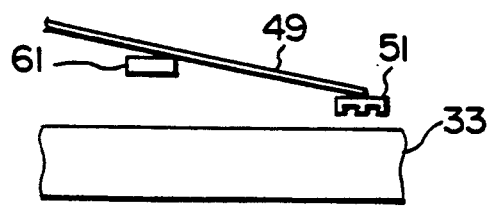
FIG. 11 is a schematic illustration viewed in the direction indicated by the arrow D in FIG. 10.
Figure 12:
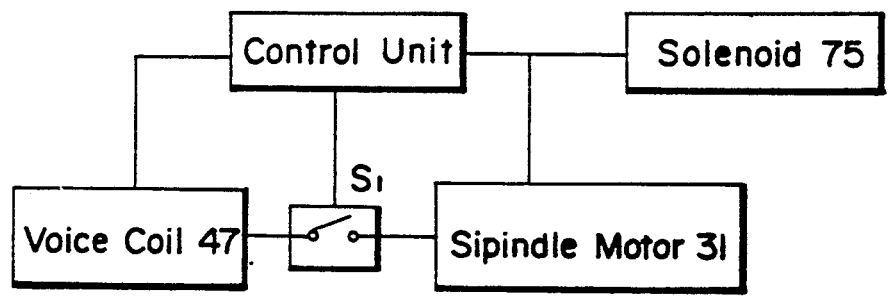
FIG. 12 is a block diagram showing the control method for the magnetic disk drive device of the present invention.

FIG. 8 is a plan view showing the relationship between the actuator 43, the lifter 61, and the lock mechanism when an embodiment of the magnetic disk drive device of the present invention is being driven. FIG. 9 is a plan view showing the equivalent relationship when the embodiment of the magnetic disk drive device of the present invention is halted (parked). FIG. 10 is a cross-sectional view taken on line C—C in FIG. 9. FIG. 11 is an explanatory illustration viewed in the direction indicated by the arrow D in FIG. 10. FIG. 12 is a block diagram showing a control method for this device. In FIG. 8, the shapes of the members may differ from those shown in FIG. 1, but, for convenience, members with the same functions have been provided with the same reference numerals. In each of these figures, only one magnetic head, one flexure, and one lifter are shown.

A swingable, flexible flexure 49 is installed on a flexure support section 43a of the actuator 43 of the magnetic disk 33. The magnetic head 51 is installed at the end of the flexure 49. When the magnetic disk 33 is rotated by the spindle motor 31, the pressure of the flexure 49 which energizes the magnetic head 51 against the surface of the magnetic disk 33 is balanced by the floating force, produced by the rotation of a slider which loads the magnetic disk 33, and the magnetic head 51 floats so that it is maintained a specified distance from the magnetic disk 33. A control signal from a control unit is sent to voice coil 47, so that a voice coil motor is driven in rotation and the actuator 43 is rotated around the rotary shaft 45. Thus, the magnet head 51 is driven to access the magnetic disk 33 to read out or write in data.

An area outside a most outerly perimeter section 33a and inside a most innerly perimeter section 33b of a data area A of the magnetic disk 33 forms a non-memory area B. The lifter 61 is floatingly set in the non-memory region B inside the most innerly perimeter section 33b, separated from the magnetic disk 33, and, in the same manner, is secured and supported on the lifter support member 63, separated from the magnetic disk 33.

On completion of the reading or writing of data by the magnetic head 51, or when the power supply to the spindle motor 31 is interrupted because a power outage or the like occurs, a switch $S_1$ comes ON, and counter electromotive force produced by the rotation of the spindle motor 31, which continues to rotate from inertial force after the power interruption, is supplied to the voice coil 47, and the actuator 43 rotates so that the magnetic head 51 moves toward the center of the magnetic disk 33. From this effects, as shown in FIG. 10 and FIG. 11, the flexure 49 contacts a tapered section 61a of the lifter 61 and rides up onto the tapered section 61a. The magnetic head 51 is supported over the magnetic disk 33, in a state separated from the magnetic disk 33, by the lifter 61.

Figure 13:
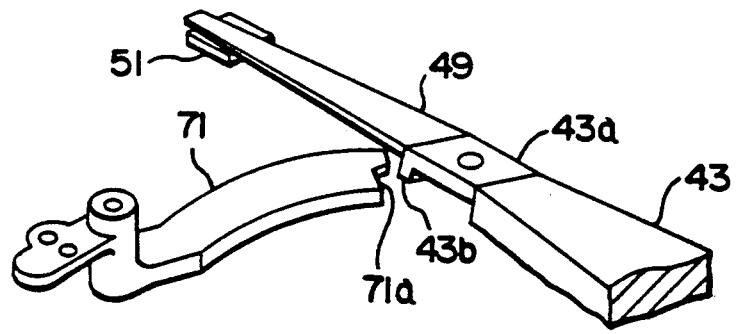
FIG. 13 is a perspective view showing the relationship between a lock lever and an actuator.
Figure 14:
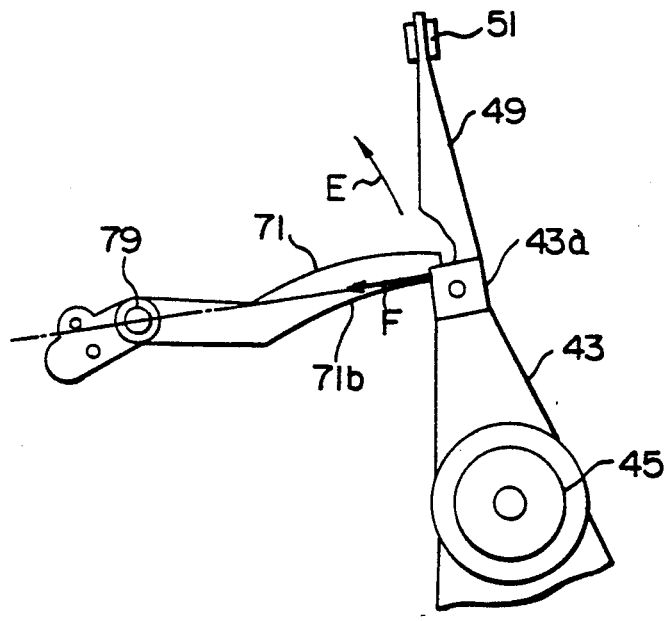
FIG. 14 is a partially cutaway plan view of the lock lever and the actuator shown in FIG. 13.

At this time, the movement of the actuator 43 is locked by a lock lever 71, as shown in FIG. 9. FIG. 13 is a perspective view, and FIG. 14 is a plan view, showing the relationship between the lock lever 71 and the actuator 43.

When the power to the magnetic disk drive mechanism is turned OFF, a solenoid 75 is OFF and a plunger 77 is extended by a spring 73. As a result, the lock lever 71 rotates around a rotary shaft 79 and a curving side section 71b of the lock lever 71 is energized by a spring 73' to contact an engaging section 43b suspended from the flexure support section 43a on the actuator 43. The actuator 43 opposing this energizing force approaches the lock position, and the suspended engaging section 43b rotates to that is slides on the curving side section 71b. The suspended engaging section 43b is then engaged to become interposed in an engaging section 71a of the lock lever 71 so that the actuator 43 is locked by the lock lever 71.

In this manner, the flexure 49 riding up onto the lifter 61 and the actuator 43 is secured by the lock lever 71, and the magnetic head 51 is separated from the magnetic disk and secured.

As shown in FIG. 10, the amount of separation of the lower end of the tapered section 61a at the end of the lifter 61 and the magnetic disk 33 is smaller than the amount of floating of the flexure 49, onto which the head 51 rides from the magnetic disk 33, so that the flexible flexure 49 which can swing with respect to the surface of the disk 33 touches the tapered section 61a and rides slidingly onto the tapered section 61a, and is supported by the lifter 61. It is desirable that the lifter 61 be formed from a material with a low coefficient of friction which is highly resistant to wear from the repeated contact and sliding of the flexure 49, and in addition the lifter 61 should have light weight and high strength. Specifically, synthetic resins and the like can be given as examples of materials of construction. The lifter support member 63 which secures the lifter 61 should also be formed of a light weight, strong rigid material with little flexibility. Specifically, a metal such as aluminum is desirable for this application. When a rigid member of this type is used, the lifter support member 63 has almost no flexibility and can support the lifter 61 on the magnetic disk 33, maintaining a uniform distance. In addition, even if the lifter support member 63 were flexible, if the lifter 61 were formed from a flexible material such as a synthetic resin there would be no damage to the magnetic disk 33 because the lifter 61 first contacts the magnetic disk 33. Furthermore, because the lifter 61 is supported outside the data area of the magnetic disk 33, there is no concern about data being destroyed from contact. In addition, the lifter 61 and the lifter support member 63 are secured and immovable. Therefore, adjustment during assembly is unnecessary and no positional deviation is produced during use of the device.

In the locked state, as shown in FIG. 14, when the actuator 43 is about to rotate so that it will impact an outer section or the like, a force F is applied toward the rotary shaft 79 which is the center of rotation of the lock lever 71. For this reason, the force F is not applied to rotate the lock lever 71 and the locked state is no released. In addition, the surfaces of the engaging section 71a of the lock lever 71 and the engaging section 43a of the actuator 43 come into contact so that a reliable locking is attained and the actuator 43 is prevented from swinging as the result of external forces.

In addition, when the lock is released the lock lever 71 rotates in the direction E in FIG. 14 and moves away from the actuator 43. The lock lever 71 is therefore applied smoothly and is not affected by contact, rubbing or the like against the actuator 43.

A reliable lock can therefore be attained with this lock mechanism with a small force from the solenoid 75.

When driving occurs, as shown in FIG. 8, the spindle motor 31 is rotated and, from the state shown in FIG. 9, the plunger 77 of the solenoid 75 is drawn, the lock lever 71 is rotated so that the lock is released, an electric current is supplied to the voice coil 47 to drive the voice coil motor 7 is driven, and the magnetic head 51 is moved to the data area A. At this time, the flexure 49 causes the tapered section 61a of the lifter 61 to descend and the support of the flexure 49 is slowly released by the lifter 61 so that impact with the magnetic disk 33 is prevented when the magnetic head 51 comes to rest.

When the solenoid 75 is started it activates the plunger 77 with a comparatively high voltage (for example, 12 V) and draws it out to a specified position. After the plunger 77 is drawn out, it can be activated by a comparatively low voltage (for example, 5 V) so that it is desirable to reduce the voltage applied to the solenoid 75 to reduce power consumption and prevent an increase in temperature from the generation of heat.

Figure 15:
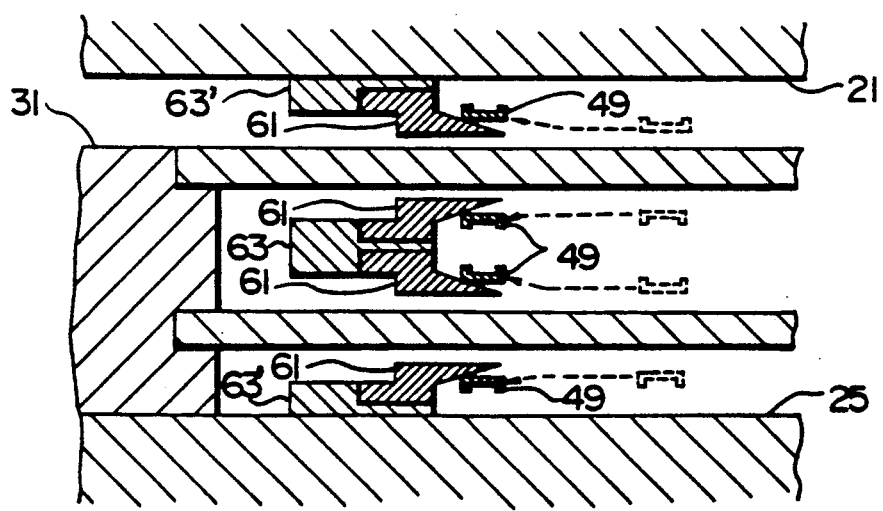
FIG. 15 is an explanatory diagram showing an example of a support structure of a lifter of the magnetic disk drive device of the present invention.

FIG. 15 is an explanatory diagram showing a typical embodiment of the present invention. The flexure 49, which supports a plurality of magnetic heads (omitted from the figure) which is driven to access the data area A of the magnetic disk 33, is shown riding up onto the lifter 61, which is supported by the lifter support member 63, and supported on the non-data area B at the inner peripheral side of the magnetic disk 33. The upper side of a lifter support member 63' can be directly secured to the housing cover 21 which is above it, and the lower side of the lifter support member 63' can be directly secured to the housing base 25 which is below it. It is possible to make the lifter support members 63', 63' thin so that the device can be made thin and small overall.

Next, the parking drive control method of the present invention will be explained. As has already been shown in FIG. 12, when the power to the magnetic disk drive device is turned OFF by halting the device or from a power outage, a counter electromotive voltage from the spindle motor 31, which continues to rotate from inertia, closes the switch $S_1$ which supplied power to the voice coil 47. As a result, the actuator 43 rotates to the position shown in FIG. 8, and the flexure 49 rides up onto the lifter 61 and halts. However, at this time, as shown in FIG. 12, when the counter electromotive voltage from the spindle motor 31 is supplied unchanged to the voice coil 47 the speed of rotation of the actuator 43 is too high and the flexure 49 roughly contacts the lifter 61, giving rise to concern that the magnetic head 51 will collide with the magnetic disk 33 from the resulting swings.

Figure 16:
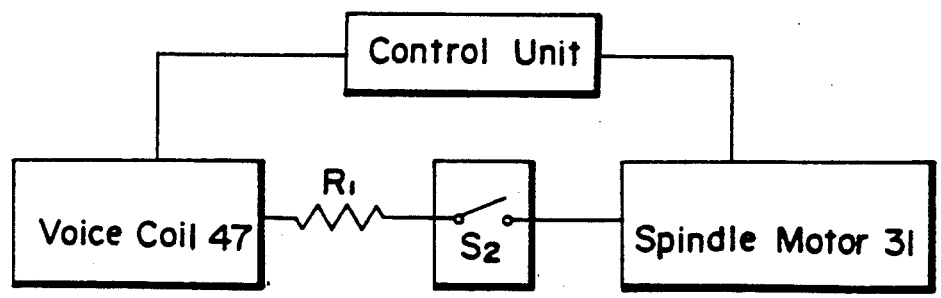
FIG. 16 is a block diagram showing the parking drive control for a magnetic head for use in the present invention.

Accordingly, with the parking drive control method of the present invention, as shown in FIG. 16, a switch $S_2$ is closed, a reduced voltage is applied from the counter electromotive voltage from the spindle motor 31 being passed through a resistance $R_1$, and a suitable sized current flows through the voice coil 47. As a result, the speed of rotation of the actuator 43 does not become excessively large, and the flexure 49 does not impact the lifter 61 with excessive severity, so the magnetic head 51 does not impact the magnetic disk 33.

Figure 17:
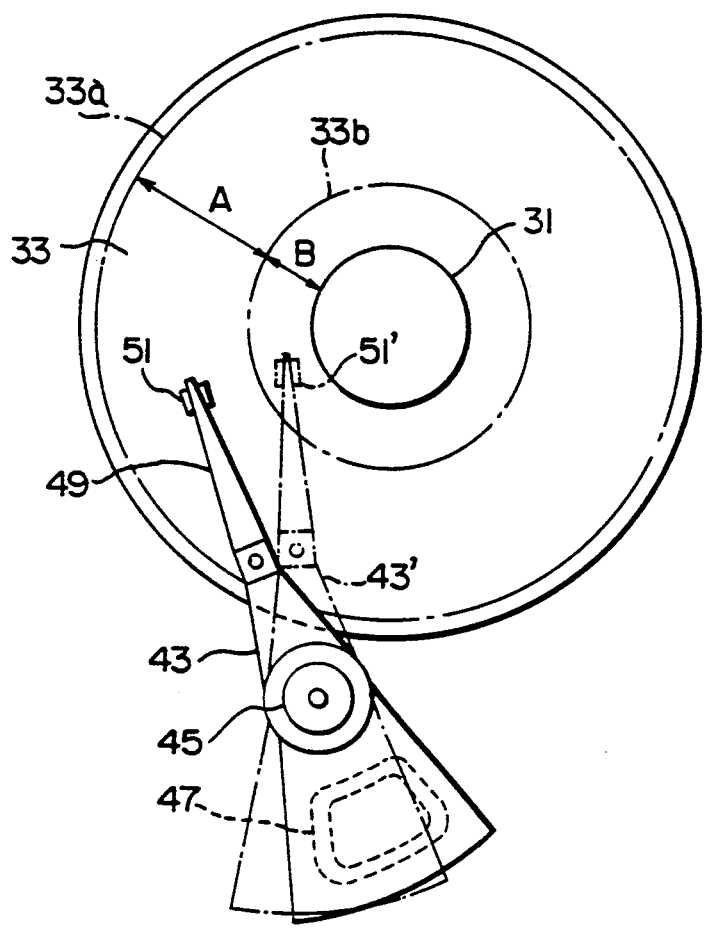
FIG. 17 is an explanatory illustration showing an example of the parking drive method for the magnetic head.

The parking drive method in which the voltage of the counter electromotive force from the spindle motor 31 shown in FIG. 16 is reduced and supplied to the voice coil 47 is not restricted to the method by which the magnetic head is caused to float at the inner peripheral side of the magnetic disk, as shown in FIG. 8 FIG. 9, and parked. The method in which the head is parted at the outer peripheral side of the magnetic disk by means of the lifter, or the method by which the magnetic disk is caused to come to rest directly on the non-memory area at the inner peripheral side of the magnetic disk is also acceptable. FIG. 17 shows an example of the latter method. The magnetic head 51 which performs the read/write operation is moved to the non-memory area B of the magnetic disk 33 by halting the device, an comes to rest directly on the magnetic disk 33. In this case also, a voltage of a suitable magnitude is applied to the voice coil 47 so that the speed of rotation of the actuator 43 does not become excessive, and, as shown by a position 51' of the magnetic head 51, the magnetic head 51 comes to rest gently on the magnetic disk 33.

Figure 18:
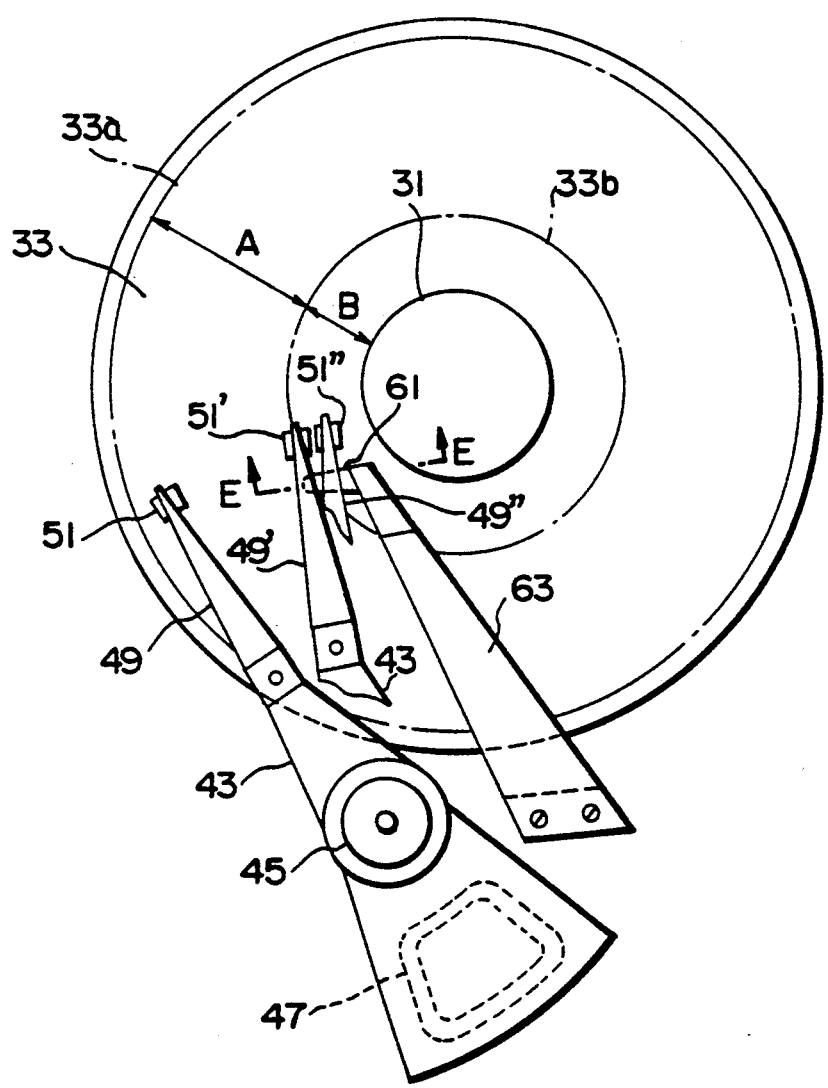
FIG. 18 is an explanatory illustration showing another example of the parking drive method for the magnetic head.
Figure 19:
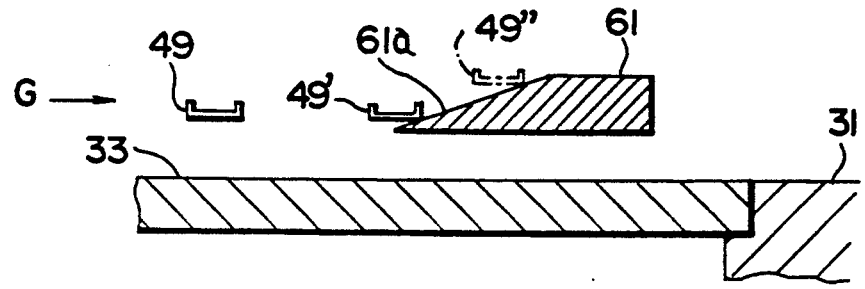
FIG. 19 is a cross-sectional view taken on line E—E in FIG. 18.
Figure 21:
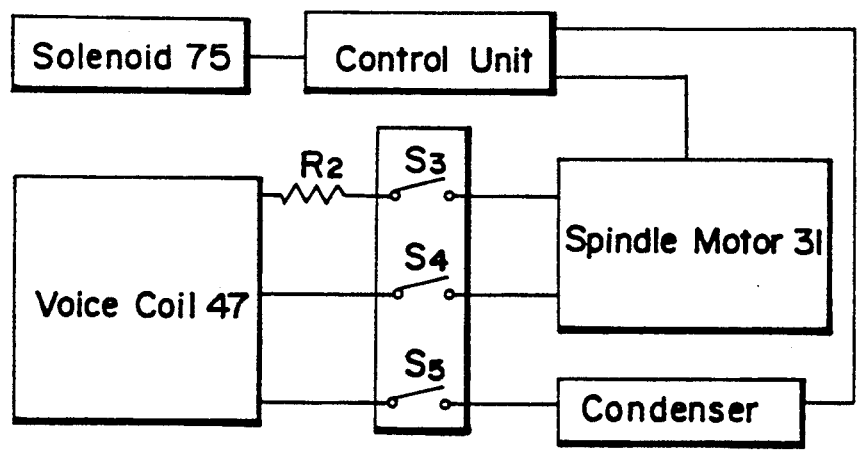
FIG. 21 is a block diagram showing another embodiment of the parking drive control method for the magnetic head.
Figure 22:
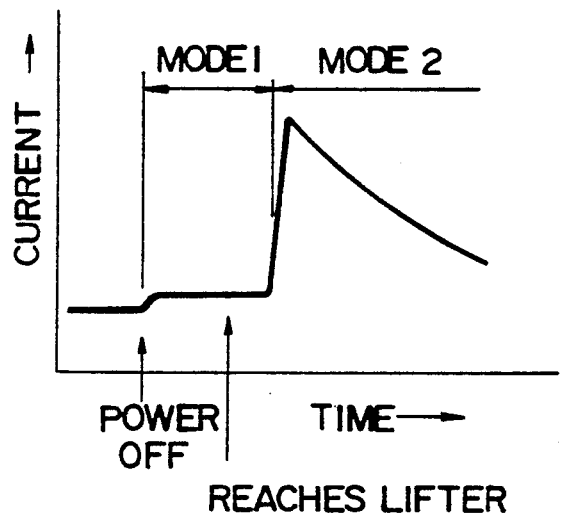
FIG. 22 is a graph showing the changes in the current flowing in a voice coil.

FIG. 18 is an explanatory illustration showing another example of the parking drive method for the magnetic head with the lock mechanism omitted from the figure. FIG. 19 is a cross-sectional view taken on line E—E in FIG. 18. FIG. 21 is a block diagram showing a control method for this parking drive operation, and FIG. 22 is a graph showing the changes in the current flowing in the voice coil 47 during control.

As shown in FIG. 18, the magnetic head 51 which has been driven to access the data area A is moved from the position 51 to 51' to 52" by a stoppage in the power to the magnetic head drive device. Here, the movement of the magnetic head 51 from the position 51 to the position 51' is called the first mode (first step), and the movement of the magnetic head 51 from the position 51' to the position 51" is called the second mode (second step).

Figure 20:
FIG. 20 is a schematic illustration in the direction indicated by the arrow G in FIG. 19.

The first mode is the time during which the magnetic head 51, which is positioned in the data area A, is supported by the lifter 61; its movement toward the final parking position at which it is locked by the lock lever 71 commences; the flexure 49 which is supporting the magnetic head 51 reaches a position 49'; and the lifter 61 contacts the tapered section 61a (see FIG. 19 and FIG. 20). During this interval, as shown in FIG. 21, the control unit operates so that a switch $S_3$ is ON (closed) and a pair of switches $S_4$, $S_5$ are OFF (open), the counter electromotive force from the spindle motor 31 is passed through a resistance $R_2$ to reduce the voltage, and the reduced voltage is applied to the voice coil 47. The value of the current flowing in the voice coil 47 is small, as indicated in the first mode in FIG. 22, and the actuator 43 rotates at a low speed. At the time when the flexure 49 reaches the position 49', it touches the tapered section 61a of the lifter 61. Because the speed is low the impact is small so that the flexure 49 at the position 49' does not receive a large vibration from the impact and the magnetic head 51 at the position 51' does not strike the magnetic disk 33.

Even after the flexure 49 at the position 49' has contacted the tapered section 61a of the lifter 61, for a short interval a small current under the first mode conditions is supplied to the voice coil 47. In the first mode, the power supplied is not sufficient to cause the flexure 49 to ride onto the tapered section 61a of the lifter 61. The tapered section 61a of the lifter 61 acts as a stopper and the flexure 49 stops and waits at the position shown as 49' in FIG. 19. When the power to the device is stopped, the time for the flexure 49 to contact the lifter 61 changes, depending on which position the magnetic head 51 is occupying on the magnetic disk 33, but the time in the first mode is sufficiently long, and it is desirable that the time after the flexure 49 has contacted the lifter 61 until the second mode (waiting time), should always be set.

Next, in the second mode, as shown in FIG. 22, when the voice coil 47 is supplied with a large current, the flexure 49 at the position 49' rotates with a large angular velocity, and the flexure 49 engages and rides onto the tapered section 61a of the lifter 61, is moved to the position 63" and is parked (see FIG. 19 and FIG. 20). At this time, the waiting time is equivalent to the time in the state where the flexure 49 at the position 49' contacts the tapered section 61a of the lifter 61. From there, the speed at which the flexure 49 rides up onto the lifter 61 can be kept uniform and a stable parking operation obtained because this occurs in one action onto the tapered section 61a of the lifter 61. In addition, the speed at which the flexure 49 rides up onto the lifter 61 does not become excessive and the magnetic head 51 does not strike the magnetic disk 33 because of variations in this operation.

After the flexure 49 engages and rides onto the lifter 61, the lock lever 71 engages and locks the actuator 43 (see FIG. 9 and FIG. 13).

The voltage can be supplied to the voice coil 47 in the second mode by closing the switch $S_4$ by means of the control unit and by feeding the counter electromotive voltage from the spindle motor 31 directly to the voice coil 47. Further, it is also acceptable to adjust the magnitude of the voltage through a voltage element which is smaller than $R_3$, or the like, or to close the switch $S_5$, store the electric charge in a condenser C when the device is running, then supply this charge to the voice coil 47. It is also acceptable to turn both the switch $S_4$ and the switch $S_5$ ON.

Figure 23:
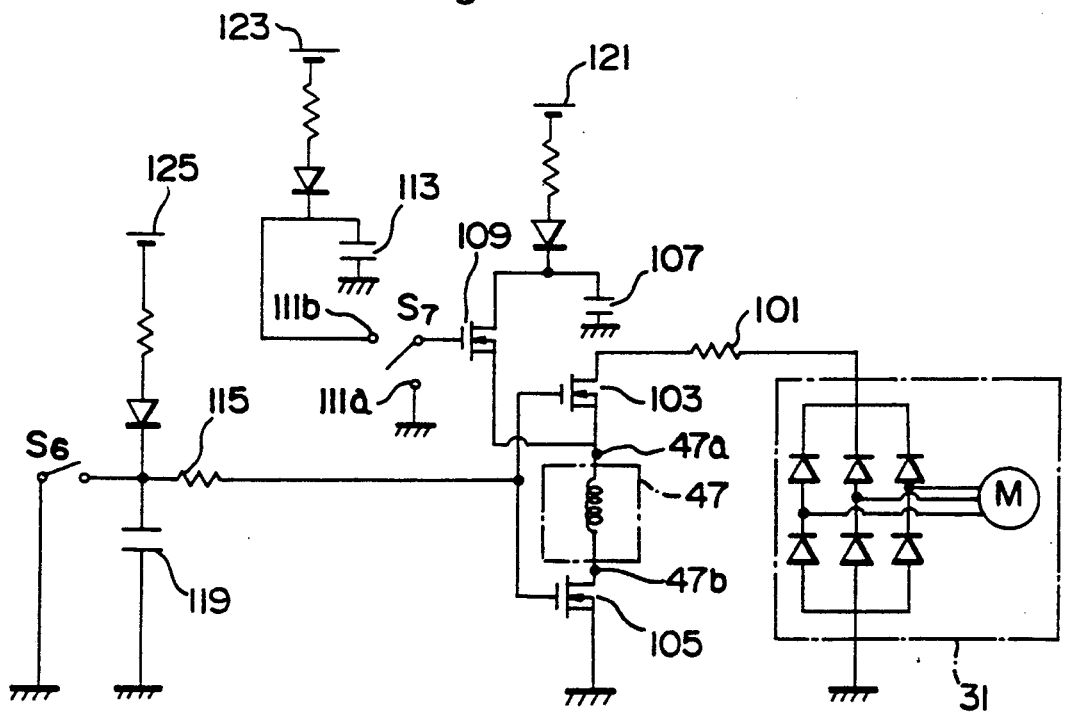
FIG. 23 is a circuit diagram showing an example of a circuit used in the present invention.

FIG. 23 is a circuit diagram showing an example of a circuit for supplying current to the voice coil 47.

A plurality of power sources 121, 123, 125 are provided. When the magnetic disk drive device is operating, a part of the voltage is applied to the device and an electric charge is stored in a plurality of condensers 107, 113, 119.

In the first mode, the switch $S_6$ is closed, the switch $S_7$ contacts a contact 111a, and the individual units in a plurality of C-MOS units 103, 105, 109 are turned OFF. In this state, when the power supply to the device is interrupted, $S_6$ is opened, C-MOS units 103, 105 are turned ON by the condenser 119, the counter electromotive voltage from the spindle motor 31 is subjected to three-phase, full-wave rectification and reduced through a resistance 31 then applied to the voice coil 47 so that a current flows through the voice coil 47. The flexure 49 rotates at low speed and the parking operation is commended. After a specified time has elapsed, $S_7$ is switched to a contact 51b and the second mode is entered. In the second mode the C-MOS unit 109 comes ON, the electric charge stored in the condenser 107 flows in one action into the voice coil 47, and the flexure 49 rotates at high speed from the position 49' to 49'', so that at the position 49'' the flexure 49 rides onto the lifter 61.

When $S_6$ is closed the C-MOS units 103, 105 are turned OFF, and the application of the counter electromotive voltage from the spindle motor 31 to the voice coil 47 ceases.

Figure 24:
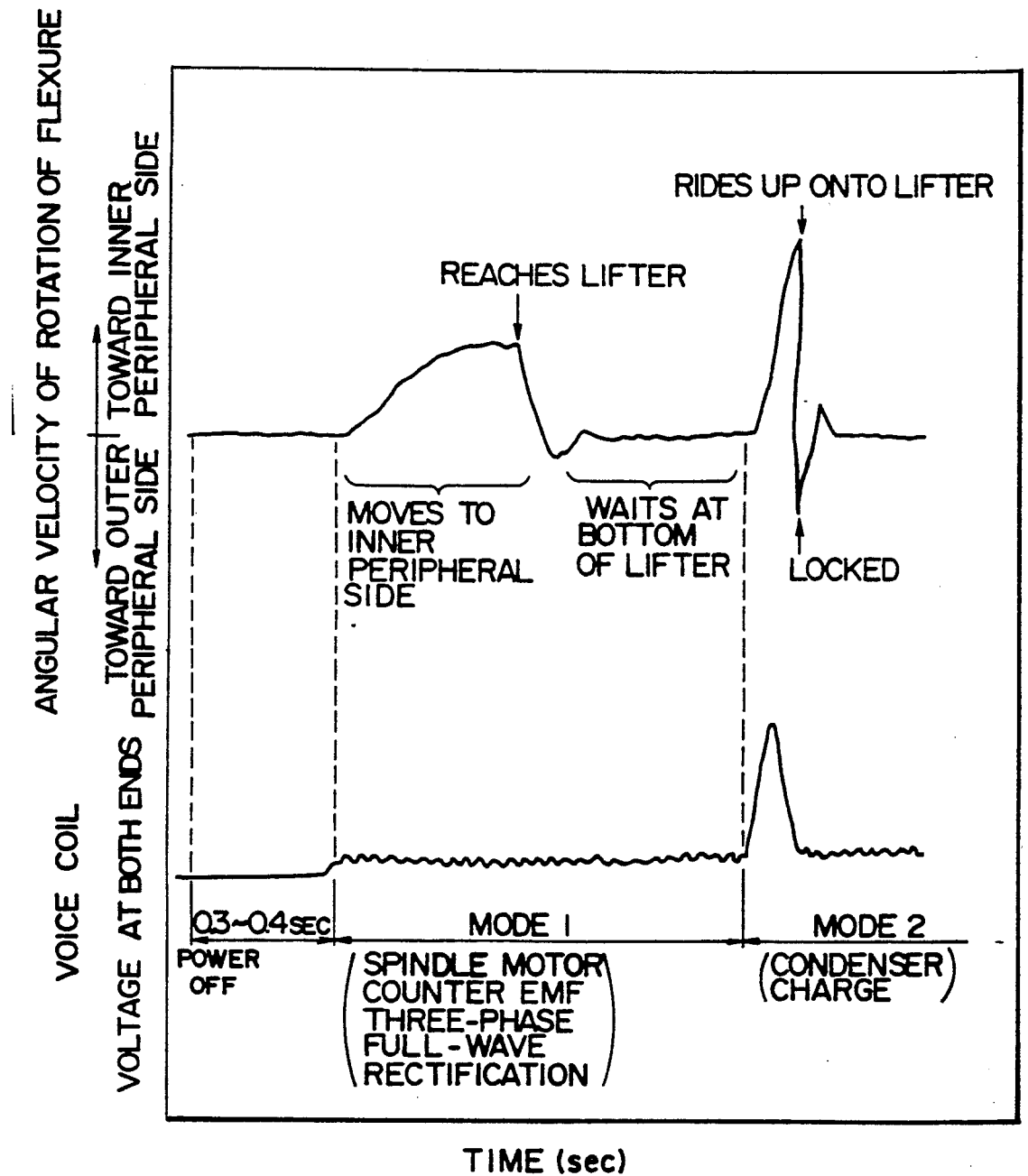
FIG. 24 is a graph showing the angular velocity of rotation of a flexure with time and the changes in the voltage at both ends of a voice coil.

FIG. 24 is a graph showing the relationship between the voltage at both ends of the voice coil 47 in one series of park drive operations and the angular rate of rotation of the flexure. As soon as the power is turned OFF, a comparatively low voltage from the spindle motor 31 is applied between the two terminals of the voice coil 47 (between 47a and 47b in FIG. 23), and the flexure 49 is rotated so that it gradually rises at high speed toward the lifter 61 to the inner peripheral side of the magnetic disk 33. When the flexure 49 at the position 49' collide with the lifter 61 the rotation of the flexure 49' comes to a halt, the flexure 49 contacts the lifter 61 and waits at the foot of the lifters 61.

On entering the second mode, when a large voltage from the electric charge in the condenser is applied across the two terminals of the voice coil 47 the flexure 49 at the position 49' rotates at a large angular rate of rotation, rides onto the lifter 61, and is locked by the lock arm 71.

With the above-mentioned drive control method, in the case where the counter electromotive force from the spindle motor 31 is sufficiently small it may be fed directly to the voice coil 47 in the first mode. Specifically, in FIG. 21, the circuit for $S_3$ is not used (normally OFF), in the first mode $S_4$ is ON and $S_5$ is OFF, and in the second mode $S_5$ is ON ($S_4$ may be either ON or OFF).

Figure 25:
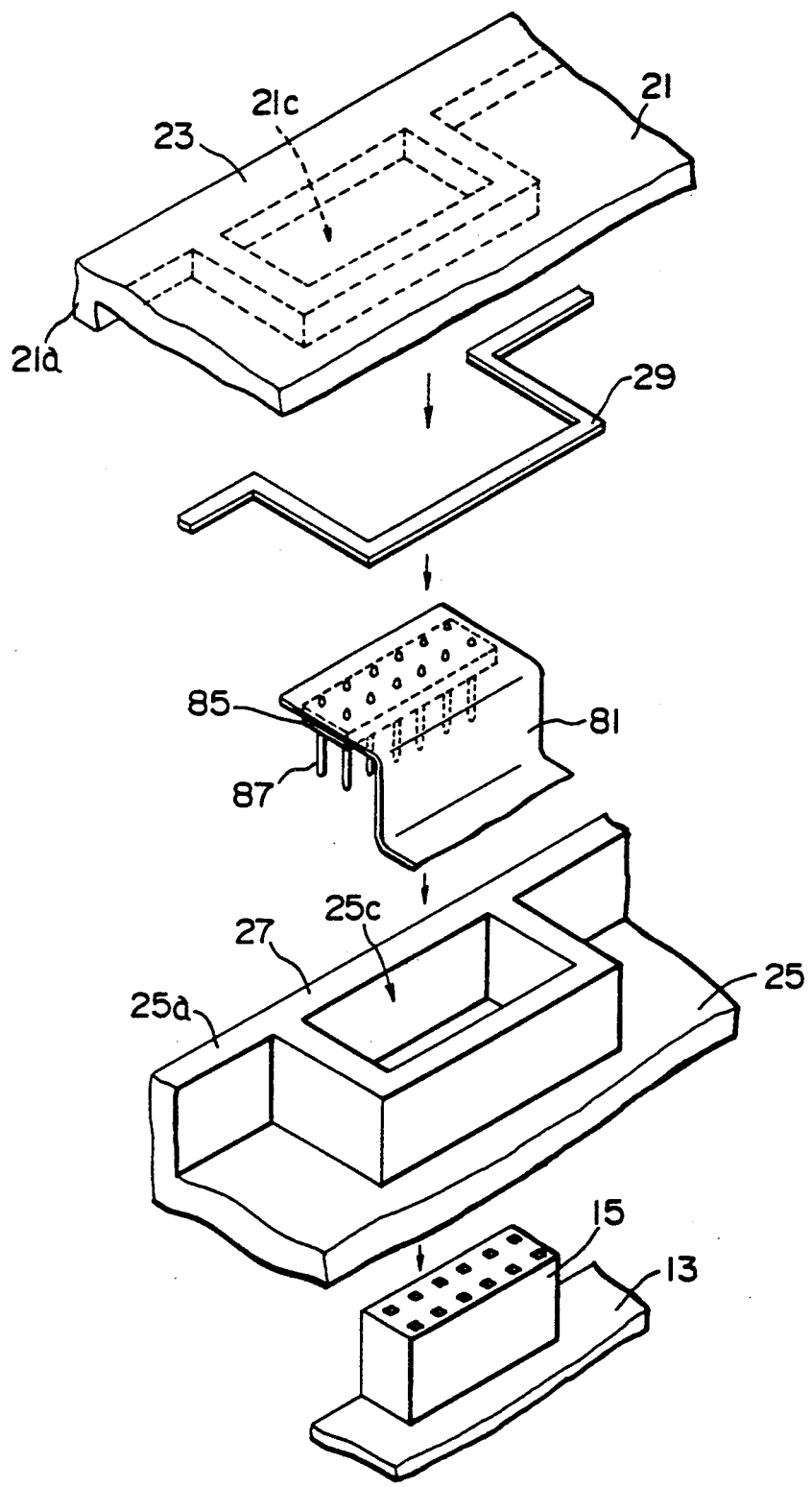
FIG. 25 is a partially exploded perspective view of an embodiment of a magnetic disk drive device of the present invention.
Figure 26:
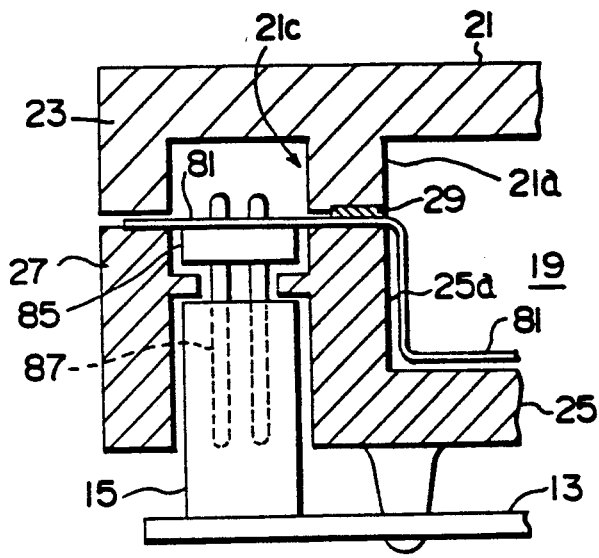
FIG. 26 is a partial vertical cross-sectional view of the magnetic disk drive device of the present invention shown in FIG. 25.
Figure 27:
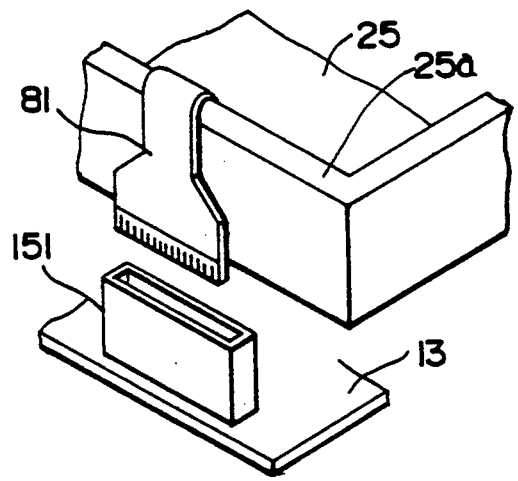
FIG. 27 and FIG. 28 are explanatory illustrations showing examples of the conventional prior art.
Figure 28:
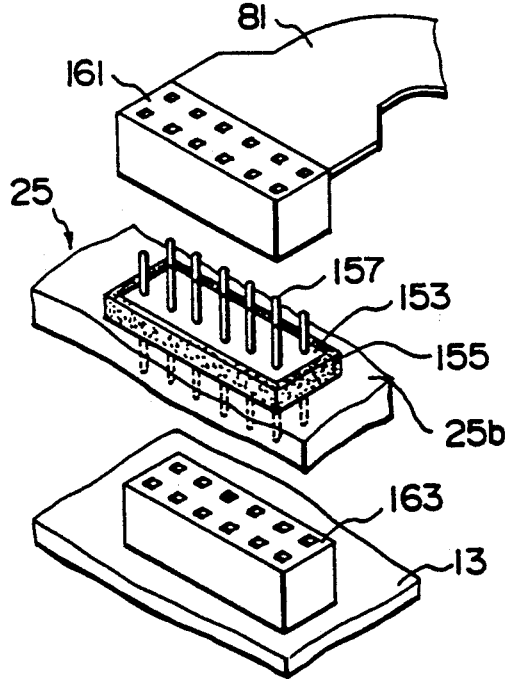

FIG. 25 is an exploded perspective figure of the pull-out section of the FPC 81 in an embodiment of the magnetic disk drive device of the present invention. FIG. 26 is a vertical sectional drawing.

The side wall section 25a of the housing base 25 of the magnetic disk drive device forms a hollowed-out section 25c which is hollowed out toward the inner housing section 19. In this embodiment of the present invention, a base outer wall 27 is also formed integrally with the housing base 25, and the hollowed section 25c assumes a shape similar to a through-hole. The FPC 81 is drawn to the outer section of the position at which the hollowed-out section 25c is formed and the pin header 85 for the FPC is installed on the drawn out section.

A gasket 29 is fitted along the upper end surface of the base side wall section 25a, and the housing cover 21 is set on top of the gasket 29 to maintain an airtight condition in the inner housing section 19. The side wall section 21a of the housing cover 21 has a hollowed-out section 21c which corresponds to the side wall shape of the housing base 25. An outer wall 23 of the cover is also formed in the same manner.

The FPC 81 is temporarily secured to the housing base 25, but when the housing cover 21 is installed the FPC 81 is securely held in place with no problem.

An airtight state can be ensured with the gasket 29 in the same way as for a conventional device. In addition, because the FPC pin header 85 is provided outside the housing, the adoption of the pin header 85 has no adverse effects on the airtight condition.

The length to which the FPC 81 is drawn outside of the housing need only be the length necessary for the installation of the FPC pin header 85. The FPC pin header 85 is housed in the hollowed-out section 25c. Also, the length to which the FPC 81 is drawn out is less than the depth of the hollowed-out section 25c. The end of the FPC 81 does not project outside.

Accordingly, a weak pattern section of the FPC 81 does not extend outside, and because it is not short and unsteady, damage to the FPC 81 is avoided. In addition, by the provision of the outer wall sections 23, 27, the two ends of the drawn out section of the FPC 81 are supported without being secured to the housing base side wall section 25a and the housing cover side wall section 21a or to the outer walls 23, 27. The drawn out section of the FPC 81 can be reliably prevented from swinging.

The FPC socket 15 is mounted on the PCB 13. While the hollowed-out section 25c and the FPC socket 15 are being positioned, by inserting and interposing the pins 87 of the FPC pin header 85 in the socket 15, the FPC 81 is electrically connected to the PCB 13. The FPC pin header 85 is secured with a certain degree of flexibility so that a small amount of movement is possible. Therefore, even when the positioning precision is not strict, it is possible to follow the connection so that the assembly operation can easily be made automatic.

In addition, in the above embodiment, a socket may be installed in place of the pin header 85 provided in the FPC 81. In this case, the pin header is mounted in the PCB 13.

Furthermore, in the hollowed-out section 25c of the housing base, the base outer wall 27 may be omitted. In this case, the outer top surface shape of the housing base 25 and the housing cover 21 becomes the same shape as the gasket 29.

The PCB 13 and the inside of the hosing are connected electrically through he FPC 81, the current is fed to the voice coil 47 and the solenoid 75, and the interchange of the read/write signals with the magnetic head 51 is carried out.

What is claimed is:

1. In a magnetic disk drive device comprising a rotary magnetic disk, a magnetic read/write head, supported by a flexure capable of swinging with respect to said magnetic disk, which floats on said magnetic disk as a result of the rotation of said magnetic disk and is driven to access said magnetic disk, and an actuator supporting said flexure and mounted for swinging said flexure with respect to said magnetic disk, the improvement wherein said magnetic disk is driven in rotation by a disk drive means, said actuator is provided with a lever engaging section, and said device further comprises: a lifter positioned to support said flexure so that said magnetic read/write head and said magnetic disk are maintained in a non-contacting state at the inner peripheral side of a data region on said magnetic disk; and a lock mechanism for locking said actuator in a locked position when said flexure is supported by said lifter, said lock mechanism including a lock lever which is pivotable about an axis and which has an actuator engaging section, said lock lever being pivotable about said axis by an energizing force from an unlocked state to a locked state into a position for bringing said actuator engaging section into engagement with said lever engaging section in order to lock said actuator in said locked position, and said axis being located so that when said actuator engaging section engages said lever engaging section, any tendency of said flexure to move away from said lifter causes said lever engaging section to press against said actuator engaging section with a force which is directed toward said axis.

2. The magnetic disk drive device as claimed in claim 1, wherein said lifter is provided with a tapered section, and said flexure is supported so that it rides onto said tapered section of said lifter.

3. The magnetic disk drive device a claimed in claim 2 wherein said tapered section of said lifter is formed from a flexible material; and said lifter is separated from said magnetic disk and is supported by a rigid lifter support member.

4. The magnetic disk drive device as claimed in any one of claims 1 to 3, wherein said disk drive means is a spindle motor and, further comprising a parking mechanism which supports said flexure by means of said lifter, wherein when the power supply to said spindle motor is interrupted, said spindle motor, by means of subsequent rotations, feeds a counter electromotive force to a starting circuit for an actuator flexure, and moves said magnetic head to the inner peripheral side from a data area on said magnetic disk.

5. The magnetic disk drive device as claimed in claim 1, wherein said lock lever disengages without contacting said actuator when the locking of said lock mechanism is released by the rotation of said lock lever.

6. The magnetic disk drive device as claimed in claim 1 wherein said lock mechanism causes said lock lever to rotate from a locked position to an unlocked position through a plunger driven by a solenoid and maintains said lock lever in a lock release position and is connected to a power source which supplies a comparatively high voltage to said solenoid when said plunger is driven, and a comparatively low voltage to said solenoid when the plunger is held.

7. The magnetic disk drive device as claimed in claim 1, wherein, when said lock lever is pivoted from the unlocked state to the locked state, first said lever engaging section of said actuator and a non-engaging section of the energized lock lever make contact, and, while said actuator rotates to the locked position, said lever engaging section opposes the energizing force of said lock lever, moves toward said actuator engaging section of said lock lever while contacting said non-engaging section of said lock lever, and causes said actuator engaging section of said lock lever and said lever engaging section of said actuator to engage at the locked position of said actuator.

8. A magnetic disk drive device comprising:
a housing base;
a housing cover;
a spindle motor mounted on said housing base for rotating a magnetic disk about an axis of rotation;
an actuator equipped with a flexure supporting a magnetic head which can swing with respect to the magnetic disk, which rotates around a rotary shaft to drive said magnetic head in an arc close to a radial direction of the magnetic disk;
a lifter which supports said flexure so that said magnetic head does not contact said magnetic disk at the inner peripheral side parking position of said magnetic disk; and
a lifter support member installed on said housing base close to the rotary shaft of said actuator, said support member having an outer extremity which is located close to the rotary shaft of said actuator and at which said support member is secured to said housing base, and an inner extremity disposed between said outer extremity and the axis of rotation of said disk, said lifter being supported at said inner extremity and said support member extending from said outer extremity to said inner extremity in a direction approximately parallel to a line between said magnetic head and said rotary shaft when said lifter supports said flexure.

9. The magnetic disk drive device as claimed in claim 8, further comprising a locking mechanism for said actuator mounted on said housing base close to the opposite side of said actuator with respect to said lifter support member.

10. The magnetic disk drive device as claimed in claim 8 or 9, wherein said housing base and said housing cover each have a side wall section erected on a peripheral edge section with these two side wall sections set in mutual opposition to form a box-shaped housing; and the heights of the side wall section of said housing base and the side wall section of said housing cover are substantially the same.

11. The magnetic disk drive device as claimed in claim 8 or 9, wherein a pin electric terminal for driving said spindle motor and a pin electric terminal connected to a flexible control circuit substrate mounted inside said housing are provided, projecting from said housing base; and these pin electric terminals are coupled with a socket terminal on an external drive circuit substrate positioned outside said housing.

12. The magnetic disk drive device as claimed in claim 8 wherein said lifter is located to support said flexure at a location between said actuator and said magnetic head.

* * * * *